US011290429B1

(12) United States Patent
Ashley et al.

(10) Patent No.: US 11,290,429 B1
(45) Date of Patent: Mar. 29, 2022

(54) APPARATUS AND METHOD FOR PERSONA BASED ISOLATION BROWSING

(71) Applicant: Anonyome Labs, Inc., Draper, UT (US)

(72) Inventors: Paul Ashley, Toowong (AU); Simon Gee, Varsity Lakes (AU); John David Mumford, Portola Valley, CA (US); Greg Clark, San Francisco, CA (US)

(73) Assignee: ANONYOME LABS, INC., Draper, UT (US)

(*) Notice: Subject to any disclaimer, the term of this patent is extended or adjusted under 35 U.S.C. 154(b) by 240 days.

(21) Appl. No.: 16/596,466

(22) Filed: Oct. 8, 2019

Related U.S. Application Data

(60) Provisional application No. 62/887,358, filed on Aug. 15, 2019.

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ...... *H04L 63/0421* (2013.01); *H04L 63/0884* (2013.01); *H04L 63/101* (2013.01)

(58) Field of Classification Search
CPC ............ H04L 63/0421; H04L 63/0884; H04L 63/101
See application file for complete search history.

(56) References Cited

U.S. PATENT DOCUMENTS

2019/0075130 A1* 3/2019 Petry .................... H04L 67/2814
2020/0028926 A1* 1/2020 Sprague ................ H04L 9/0877

* cited by examiner

*Primary Examiner* — Amie C. Lin
(74) *Attorney, Agent, or Firm* — Cooley LLP

(57) ABSTRACT

An apparatus has a persona services platform in communication with a user device via a network and a selected isolation browser provider via the network. The persona services platform is configured to receive from the user device a request for an isolation browser. The selected isolation browser provider is designated from a pool of isolation browser providers. Isolation browser configuration information is requested from the selected isolation browser provider. The isolation browser configuration information is augmented with persona specific configuration information to form complete isolation browser configuration information. The complete isolation browser configuration information is sent to the user device.

8 Claims, 4 Drawing Sheets

APPARATUS AND METHOD FOR PERSONA BASED ISOLATION BROWSING

CROSS-REFERENCE TO RELATED APPLICATION

This application claims priority to U.S. Provisional Patent Application Ser. No. 62/887,358, filed Aug. 15, 2019, the contents of which are incorporated herein by reference.

FIELD OF THE INVENTION

This application relates generally to communications in computer networks. More particularly, this invention relates to techniques for persona based isolation browsing.

BACKGROUND OF THE INVENTION

With the current state of identity theft, uncontrolled data collection of PII (personally identifiable information) and targeted marketing, there is a need for a user to protect personal primary identity and to compartmentalize online activity. For example, the user might prefer to use a primary identity for general browsing or reading online newspapers, separate from accessing and commenting on social media, separate from purchasing from e-commerce applications, and separate from selling items online.

One method to achieve this separation (or compartmentalization) is to allow a user to create multiple personas and then use them for different purposes. Each persona has its own unique identity attributes that may include name, phone number, email address, handle, virtual credit cards, virtual private network (VPN) configuration, browser state, log-in credentials, and shipping address. Each persona should be used for a limited and specific purpose. Consequently, tracking of each of the user's personas would not form a complete picture of the user's activity. The personas act as a personal privacy proxy, not allowing people and online services access to the user's primary identity.

It is important for a user to be able to browse the internet in a safe and secure way. That is, to be able to access different websites, and to be protected from tracking and compromise from the websites and services they use. They need to select browser software and keep it up to date (to eliminate known vulnerabilities), deploy advertising and tracker blockers, and deploy a VPN (virtual private network) service. The VPN hides the user's IP address and protects the traffic from eavesdroppers by deploying encryption technologies. However, even with these complex techniques deployed, users are still vulnerable to tracking and compromise for example by browser fingerprinting, by leveraging zero-day exploits and so on.

One new method to give increased protection from tracking and from compromise of the user's browser is to deploy a surrogate browser that works as a proxy for the user's browser software. Often called isolation browsing, the user's browser communicates with a browser proxy that interacts with the website on the user's behalf. This surrogate browser can be deployed either at the user's location (on their device or on a locally installed server) or is deployed in a cloud environment such as Amazon Web Services®. The advantages of using the isolation browser is that it makes tracking and browser compromise more difficult for a nefarious actor like a hacker or identity thief. It inhibits a nefarious actor from exploiting the user's device browser; it removes the necessity for a user to deploy a VPN for their browsing activities, and can provide advertising and tracker blocking built in.

One limitation that exists with current isolation browser technology is that there is no easy way to combine browser isolation with multiple personas. Currently the user does this manually, which is error prone, time consuming, and difficult to manage.

Thus, there is a need for a new system that facilitates multiple-persona isolation browsing.

SUMMARY OF THE INVENTION

An apparatus has a persona services platform in communication with a user device via a network and a selected isolation browser provider via the network. The persona services platform is configured to receive from the user device a request for an isolation browser configuration. The selected isolation browser provider is designated from a pool of isolation browser providers. Isolation browser configuration information is requested from the selected isolation browser provider. The isolation browser configuration information is augmented with persona specific configuration information to form complete isolation browser configuration information. The complete isolation browser configuration information is sent to the user device.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
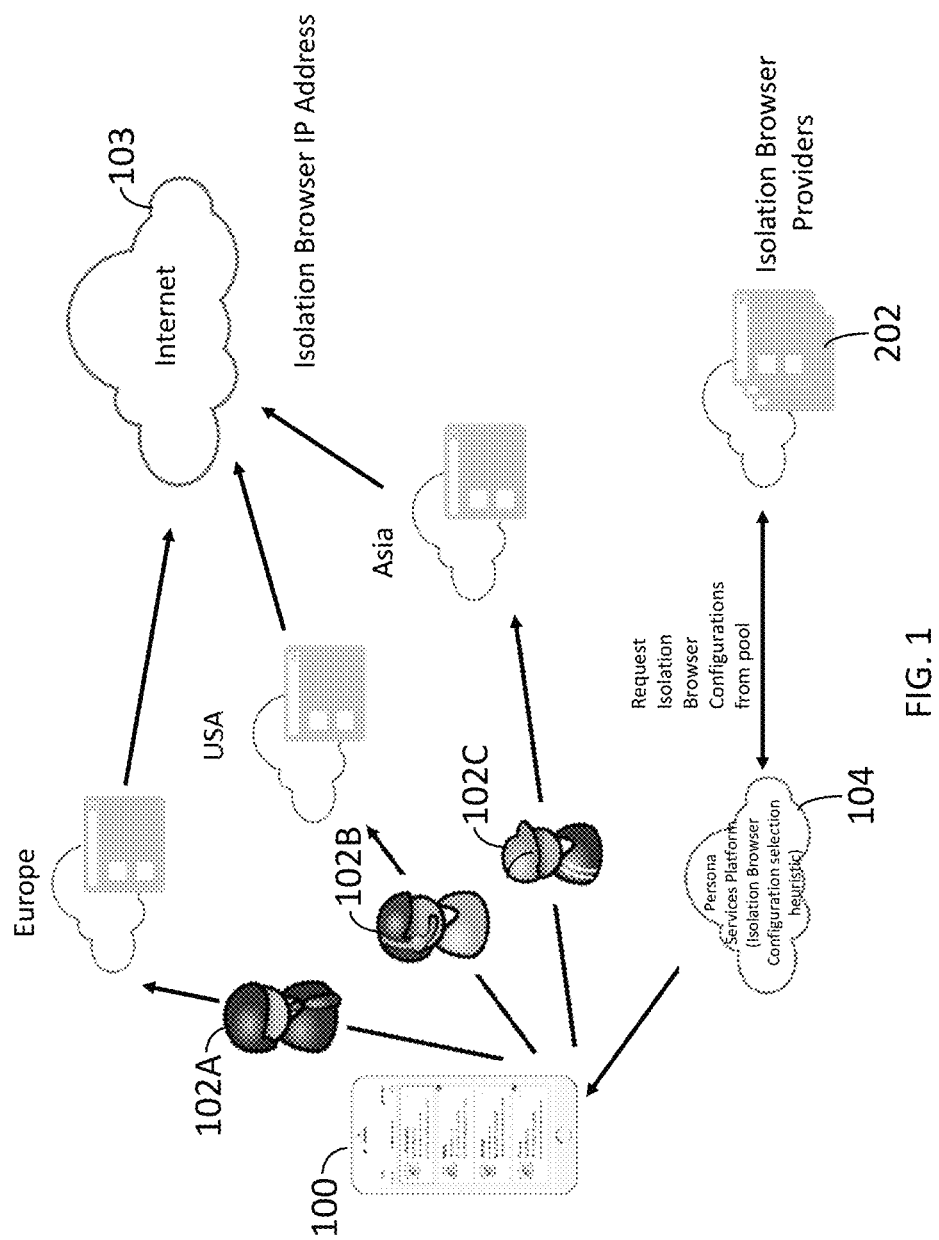
FIG. 1 illustrates a system configured in accordance with an embodiment of the invention.

FIG. 1 shows an overview of the invention. A client device 100 has a persona-based software application that supports multiple personas or digital identities 102A, 102B and 102C. One such application is MySudo® from Anonyome Labs®, Salt Lake City, Utah. Each persona is associated with a single user and has a distinct set of attributes, such as email address, telephone number, handle, virtual card number, and log-in credentials. The application accesses the Internet 103 via one of the personas. This application supports a range of persona-based services such as persona-based calling, messaging, email, browsing, payments, password management, and so on. The application installs on a mobile device, desktop or similar device.

The goal is to protect all aspects of the persona's browsing. Depending on the active persona, a persona services platform 104 determines the appropriate isolation browser configuration so that the persona application can automatically route a user's browsing activities through a different isolation browser instance. Ideally, each of the user's personas should aim to use a different isolation browser instance, at a different location (IP address egress point), from a different isolation browser software provider (such as Menlo Security® or authentic8®), accessed using different session credentials.

The persona services platform 104 has access to a number of isolation browser configurations from different isolation browser providers 202. These configurations have two aspects. The first is the information related to connecting to the isolation browser instance that the persona browser should use. The second is the session credentials for accessing that isolation browser instance. Changing isolation browser providers, changing isolation browser egress points, and changing isolation browser credentials make a nefarious actor's task of correlating across the personas extremely difficult.

Isolation browser providers typically have a number of data centers in different locations around the world to route browser traffic. A user can choose an egress location from the isolation browser service that suits the location in which the user wants traffic to appear. The user may be using a device from Brisbane, Australia, but the isolation browser routes data through a data center in North America, Europe or Asia.

To the Internet server (website) it therefore appears that the user has an IP address from the location of the isolation browser's data center, rather than the user's actual location. Also note that the IP address will most likely change each time the service is invoked as the isolation browser providers carry pools of IP addresses which they regularly take in and out of service.

A user that is regularly changing active personas must manually switch between different isolation browser providers and egress points. Therefore, an aspect of the solution is to automate the selection of isolation browser provider and egress points in the persona application based on the active persona and its attributes.

Figure 2:
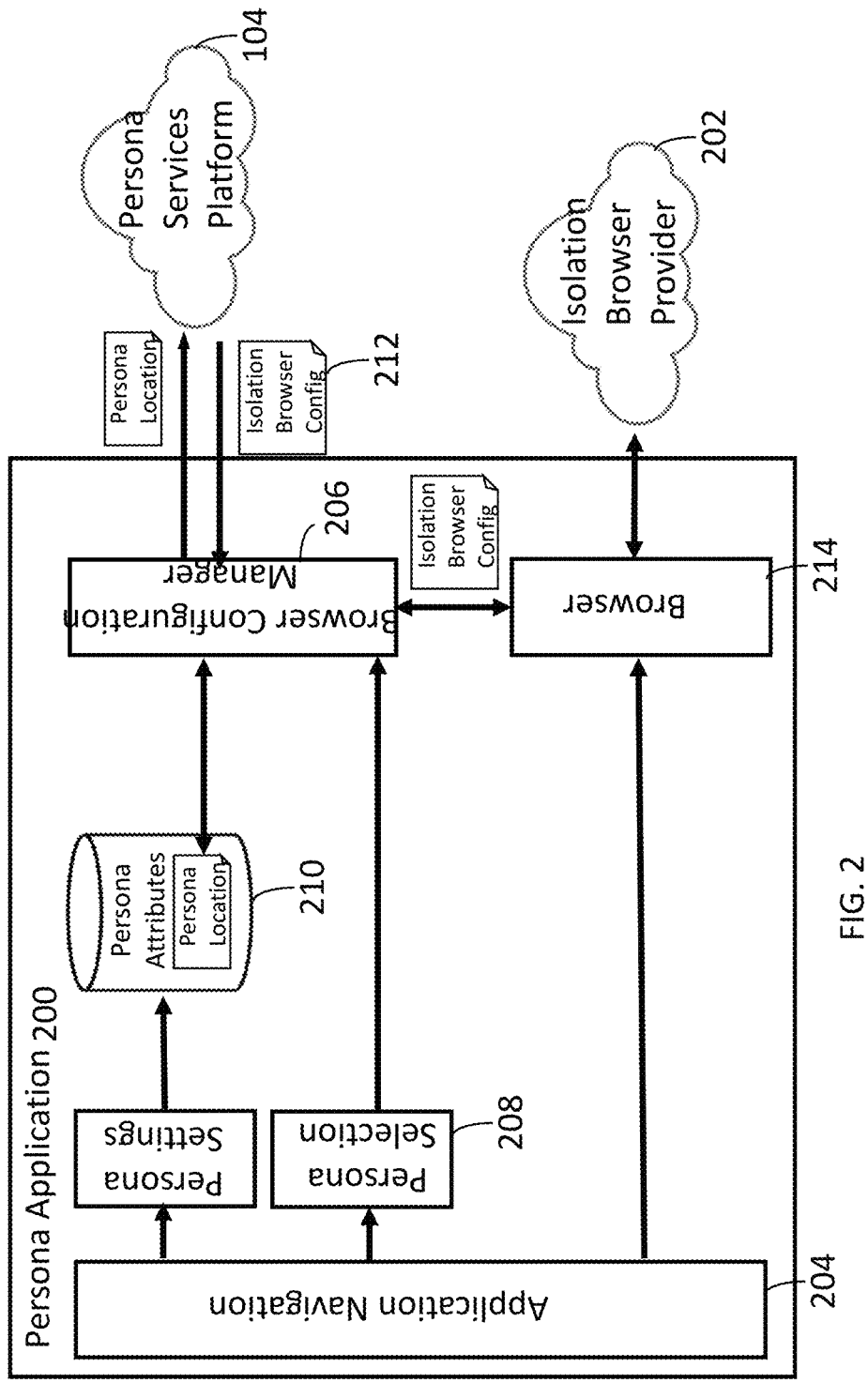
FIG. 2 illustrates a persona application configured in accordance with an embodiment of the invention.

FIG. 2 shows elements of a persona application 200 that provide safe browsing. The persona application 200 is in communication with a persona service platform 104 and an isolation browser provider 202. The user accesses the application through an application navigation layer 204. In that layer the user is able to select the active persona, configure a persona's attributes, and have access to persona functions such as browsing, email and calling. The configuration setting for the persona that is appropriate for browsing is the selection of the persona location for the isolation browser instance. Ideally, this transpires on the isolation browser instance through a specific egress location and appropriate time zone setting. This facilitates use cases such as persona one appearing to be US based with a US time zone, and persona two appearing to be European based with a European time zone.

The browser configuration manager 206 has access to the persona selection module 208 and the persona's attributes (with the desired Persona Location) 210, and communicates with the persona services platform 104 to obtain the appropriate isolation browser configuration 212. The browser configuration manager 206 provides this isolation browser configuration 212 to the persona application's browser 214. The persona application's browser 214 then communicates with the designated isolation browser instance from the isolation browser provider 202. Alternately, the communication with the designated isolation browser instance is initiated by the persona service platform 104, which subsequently switches the session to the persona application's browser 214.

An important capability is for the persona application 200 to store state of the persona's browser configuration such as history, bookmarks, tabs, cookies and specific settings, e.g. search engine. This state needs to be loaded into the isolation browser instance when the persona application's browser 214 makes its first connection.

Figure 3:
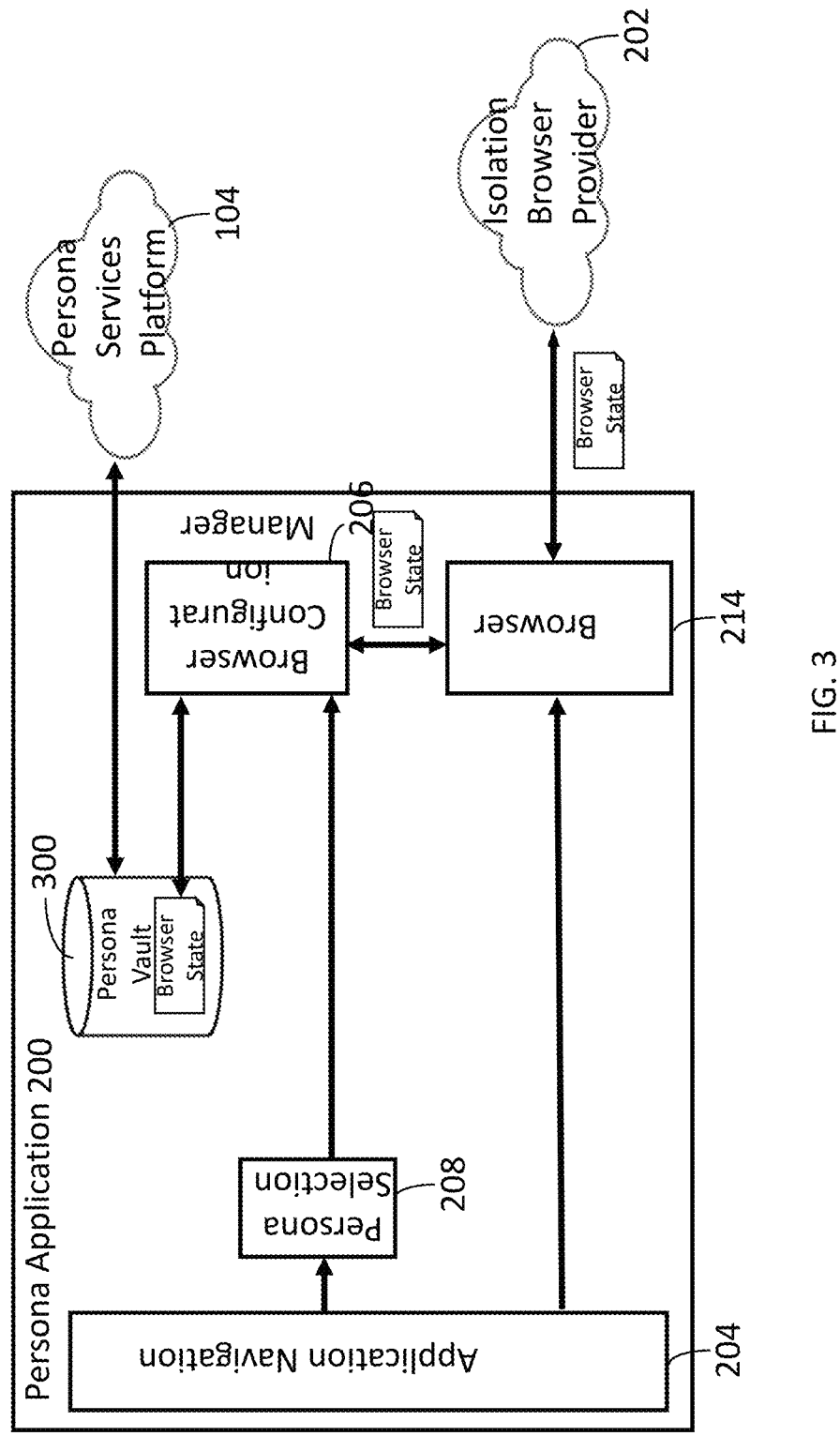
FIG. 3 illustrates a persona application configured in accordance with an embodiment of the invention.

FIG. 3 illustrates a persona application 200 with a persona vault 300. The persona vault 300 stores the persona's browser state. In one embodiment, the persona vault 300 is encrypted and is maintained in the persona services platform 104.

The browser configuration manager 206 loads the browser state into the persona application's browser 214 so that it can be communicated to the isolation browser instance. In a similar way, the persona application's browser is able to retrieve the current browser state from the isolation browser instance for storage in the vault, i.e. when the user has completed a session with the isolation browser.

Figure 4:
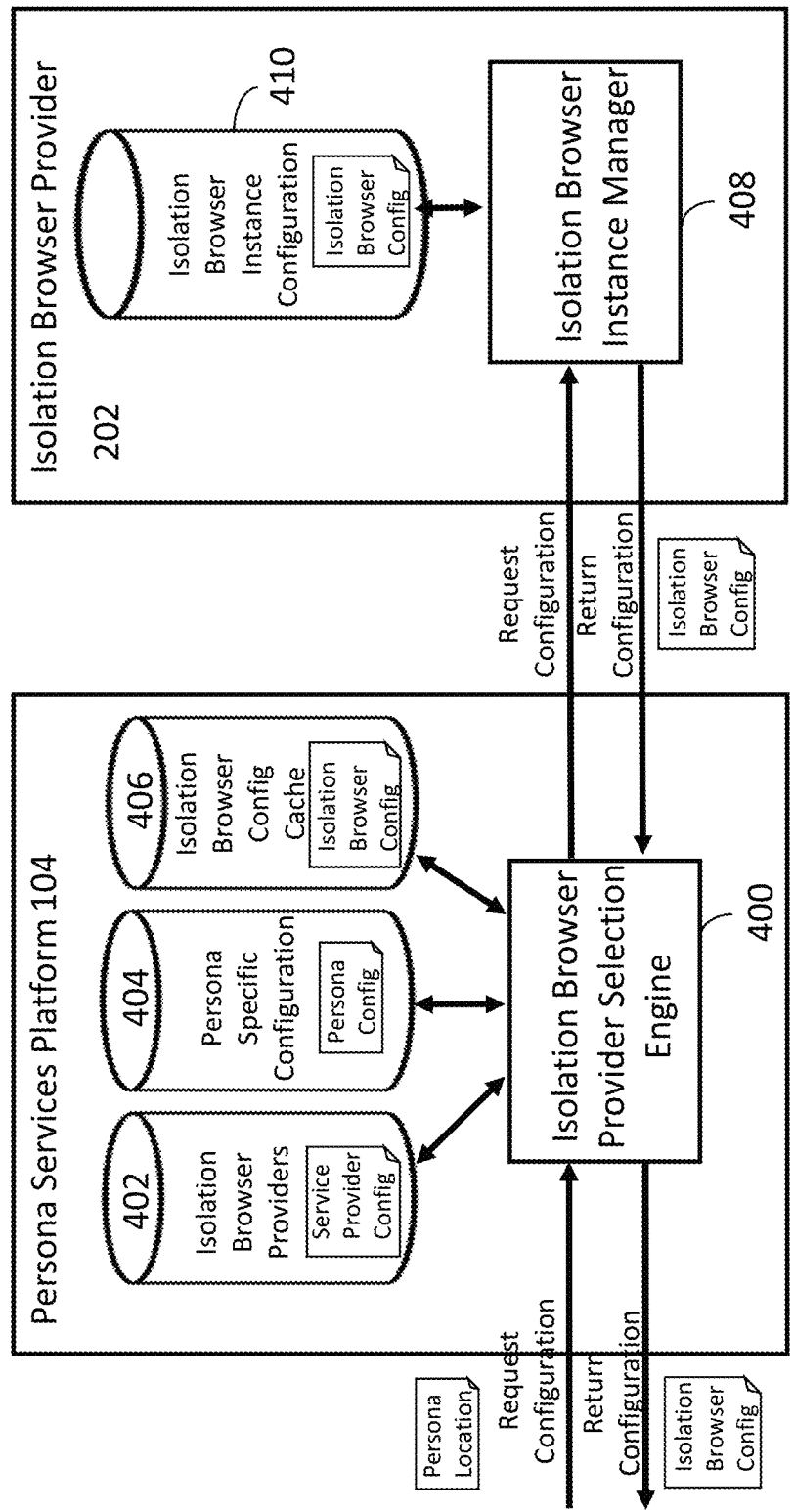
FIG. 4 illustrates a persona services platform configured in accordance with an embodiment of the invention.

FIG. 4 illustrates isolation browser instance configurations managed by the persona services platform 104. The persona application 200 calls out to persona services platform 104 to request an isolation browser instance configuration. The request optionally includes a persona location so that the persona services platform 104 knows where the isolation browser instance should egress.

The persona services platform 104 has an isolation browser provider selection engine 400. The following code provides an example of an implementation of such an engine 400.

```
IN: persona_location, persona_identifier OUT: browser_
    instance_config
Fetch persona_specific_config in 404 using persona_id-
    entifier
Generate match_criteria from persona_specific_config
    and persona_location
For each browser_instance_config in 406
{
    Compare browser_instance_config to match_criteria
    If match found return (success—browser_in-
        stance_config)
}
For each service_provider_config in 402
{
    Compare service_provider_config against match_crite-
        ria
    If match found
        call out to the service provider 202 to request brow-
            ser_instance_config
        return (success—browser_instance_config)
    else
        return (error—no browser_instance_config avail-
            able)
}
```

The engine 400 accesses a repository 404 of persona specific configurations. The following code is an example of a persona specific configuration.

```
< personas >
  < persona >
    < entitlement >
      < tier = 1 />
      < name="SudoMax" />
    </ entitlement >
    < browser_config >
      < user agent = "ie" />
      < ad-blocker>
        < whitelist_category="shopping" />
        < blacklist_category="gambling" />
      </ ad-blocker>
```

-continued

```
        <save_history = false />
    </ browser_config >
    ...
</ persona >
    ...
</ personas >
```

The persona specific configuration may include information such as the user's entitlements, e.g., gold level subscription, platinum level subscription, and the required browser user_agent, e.g., Edge, Firefox, Chrome, so that this information can be used when selecting the isolation browser instances or providers.

The engine 400 primarily accesses a cache 406 of isolation browser configurations. The following code is an example of an isolation browser configuration.

```
<isolation browser instances>
    <isolation browser instance>
        <access information>
            <access point="https://isolation/browser"/>
            <credential="token"/>
            <payload="service provider access data"/>
        </ access information>
        <tier=2/>
        <egress_geo="NA"/>
        <user_agent="ie6/>
        . . .
    </ isolation browser instance>
    . . .
</ isolation browser instances>
```

The cache allows the isolation browser provider selection engine to return an isolation browser configuration to the persona application 200 immediately when requested without having to consult the isolation browser provider in real time. If engine 400 is not able to select an isolation browser instance for the persona from cache 406 of isolation browser configurations, the engine 400 accesses a repository 402 with isolation browser provider configurations. The following code is an example of an isolation browser provider configuration 402.

```
<providers>
    <provider>
        <name="IsolationB"/>
        <egress geos="NA", "EU", "AP"/>
        <service URI=https://isolation/service/>
        <credentials="token"/>
        <selection priority=1/>
        <tier=2/>
        . . .
    </ provider>
    . . .
</ providers>
```

This information details which isolation browser providers 202 are currently available and how to communicate with them to request new isolation browser instances.

The persona services platform 104 utilizes the isolation browser provider selection engine 400 to communicate with the isolation browser provider 202 to request isolation browser instance configurations. These requests normally will operate as a background process ensuring that the isolation browser configuration cache 406 has enough isolation browser configurations to satisfy requests from the persona application 200. The isolation browser provider 202 has an isolation browser instance manager 408, which accesses a repository 410 of isolation browser instance configurations. The manager 408 supplies an isolation browser configuration to the platform 104 as a response to a request.

The engine 400 uses the isolation browser configurations from the repository 406 and persona specific configuration information from repository 404 to return an isolation browser configuration to the persona application 200.

The isolation browser configuration repository 406 is periodically updated with new isolation browser configurations. When a user no longer requires access to an isolation browser instance, the persona application 200 advises the persona services platform 104. The isolation browser instance is then marked in the isolation browser configuration cache 406 as available for use.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a persona services platform in communication with a user device via a network and a selected isolation browser provider via the network, the persona services platform configured to:
receive from the user device a request for an isolation browser,
designate the selected isolation browser provider from a pool of different isolation browser providers,
request from the selected isolation browser provider isolation browser configuration information, augment the isolation browser configuration information with persona specific configuration information to form complete isolation browser configuration information, wherein the persona specific configuration information is one of multiple personas utilized by a user for different compartmentalized browsing activities, and send the complete isolation browser configuration information to the user device.

2. The apparatus of claim 1 wherein the operation to designate the selected isolation browser provider is based upon a persona location.

3. The apparatus of claim 1 wherein the persona specific configuration information includes an entitlement tier, a whitelist category and a blacklist category.

4. The apparatus of claim 1 wherein the isolation browser configuration information includes an access point link, a credential and service provider access data.

5. The apparatus of claim 4 wherein the service provider access data includes a uniform resource identifier and credentials.

6. The apparatus of claim 4 wherein the service provider access data includes a list of supported network egress locations, supported tier and priority.

7. The apparatus of claim 1 wherein the isolation browser configuration information includes a network egress location.

8. The apparatus of claim 1 wherein the persona services platform is further configured to match the isolation browser configuration information with a cache of isolation browser configuration information.

\* \* \* \* \*

UNITED STATES PATENT AND TRADEMARK OFFICE
CERTIFICATE OF CORRECTION

| | | |
|---|---|---|
| PATENT NO. | : 11,290,429 B1 | Page 1 of 1 |
| APPLICATION NO. | : 16/596466 | |
| DATED | : March 29, 2022 | |
| INVENTOR(S) | : Paul Ashley et al. | |

It is certified that error appears in the above-identified patent and that said Letters Patent is hereby corrected as shown below:

On the Title Page

Item (72) Inventor:
Add -- Steven Harvey McCown, Salt Lake City, UT (US) --

Signed and Sealed this
Nineteenth Day of July, 2022

*Katherine Kelly Vidal*

Katherine Kelly Vidal
*Director of the United States Patent and Trademark Office*